United States Patent

Alwes et al.

[11] 3,937,447
[45] Feb. 10, 1976

[54] INJECTION MOLDING APPARATUS

[75] Inventors: Dieter Alwes; Helmut Eckardt, both of Hilchenbach-Dahlbruch; Hans Peter Leiste, Kirchhundem; Robert Albert Melcher, Wenden-Gerlingen, all of Germany

[73] Assignee: Siemag Siegener Maschinenbau GmbH, Hilchenbach-Dahlbruch, Germany

[22] Filed: Sept. 7, 1973

[21] Appl. No.: 395,124

[30] Foreign Application Priority Data
Dec. 27, 1972 Germany............................ 2263571
June 2, 1973 Germany............................ 2328222

[52] U.S. Cl. .................................. 259/191; 259/8
[51] Int. Cl.² ........................................ B29B 1/10
[58] Field of Search ......... 259/191, 192, 193, 9, 10, 259/7, 8, 25, 26, 23, 24, 43, 44, 45, 46, 194; 425/207, 208, 209

[56] References Cited
UNITED STATES PATENTS

| | | |
|---|---|---|
| 3,385,671 | 5/1968 | Axelsson .................. 259/8 |
| 3,728,053 | 4/1973 | Stillhard .................. 259/191 |
| 3,795,386 | 3/1974 | Carter ..................... 259/191 |
| 3,822,057 | 7/1974 | Wheeler ................... 259/191 |
| 3,825,235 | 7/1974 | Walter .................... 259/191 |

Primary Examiner—Robert W. Jenkins
Attorney, Agent, or Firm—Norman S. Blodgett; Gerry A. Blodgett

[57] ABSTRACT

The invention is concerned with an injection molding apparatus in which thermoplastic material mixed with an expanding agent is kept in a plastic state below the reaction temperature of the agent and is passed generally continuously through an inter-connecting passage to a transfer cylinder; by flowing through the passage, the mass is heated above the reaction temperature and the built-up pressure prevents foaming of the thermoplastic until it is injected into a mold.

28 Claims, 3 Drawing Figures

3,937,447

INJECTION MOLDING APPARATUS

BACKGROUND OF THE INVENTION

Injection molding apparatus for making structural foam plastic is shown in German Pat. No. 1,932,437 in which an inter-connecting passage is surrounded by heating coils for heating up the plastic mass. Intense heating is achieved by use of an inner body which is also equipped with heating coils and so enlarges the heating surface available to the plastic masses. To make the product homogenous, the plastic flow takes place through jets or the cross-section of the flow area is of meander shape. In practice, it has been shown that a more intense heating is desirable; also, with respect to homogenizing, further mixing is desirable. Furthermore, experience has proved that meander-shaped flow passages are expensive because of their complicated design; in addition, jet passages require a high pressure differential to produce flow of the plastic mass. These and other difficulties experienced with the prior art devices have been obviated in a novel manner by the present invention.

It is, therefore, an outstanding object of the invention to provide injection molding apparatus in which relatively simple parts are used, so that, without large pressure-drop and influence on mixing, intense heating is possible.

SUMMARY OF THE INVENTION

This task is solved in such a way that a device of the described kind has an inter-connecting passage equipped with motor-driven rotating body which is surrounded by a narrow housing and the thermoplastic mass is pressed through the gap formed between the rotating body and the housing with an axial component of motion. It has been discovered to be practical to use the gap with a thickness less than 2 mm. In many cases, it was found of advantage to make the gap less than 1 mm or even as small as 0.6 mm. The rotating body and the surrounding housing are equipped with grooves running across their circumferences. It has been found to be of advantage to equip the housing with heating elements. It is also desirable, in addition, to equip the rotating body with heating elements and a commutator ring, the latter assisting in the rotation and serving for electrical contact.

The rotating body is of cylindrical form, at least intermediate of its length. The end surfaces of the rotating body can be pointed, preferably conical.

BRIEF DESCRIPTION OF THE DRAWINGS

The character of the invention, however, may be best understood by the reference to one of its structural forms, as illustrated by the accompanying drawing, in which.

DESCRIPTION OF THE PREFERRED EMBODIMENT

Figure 1:
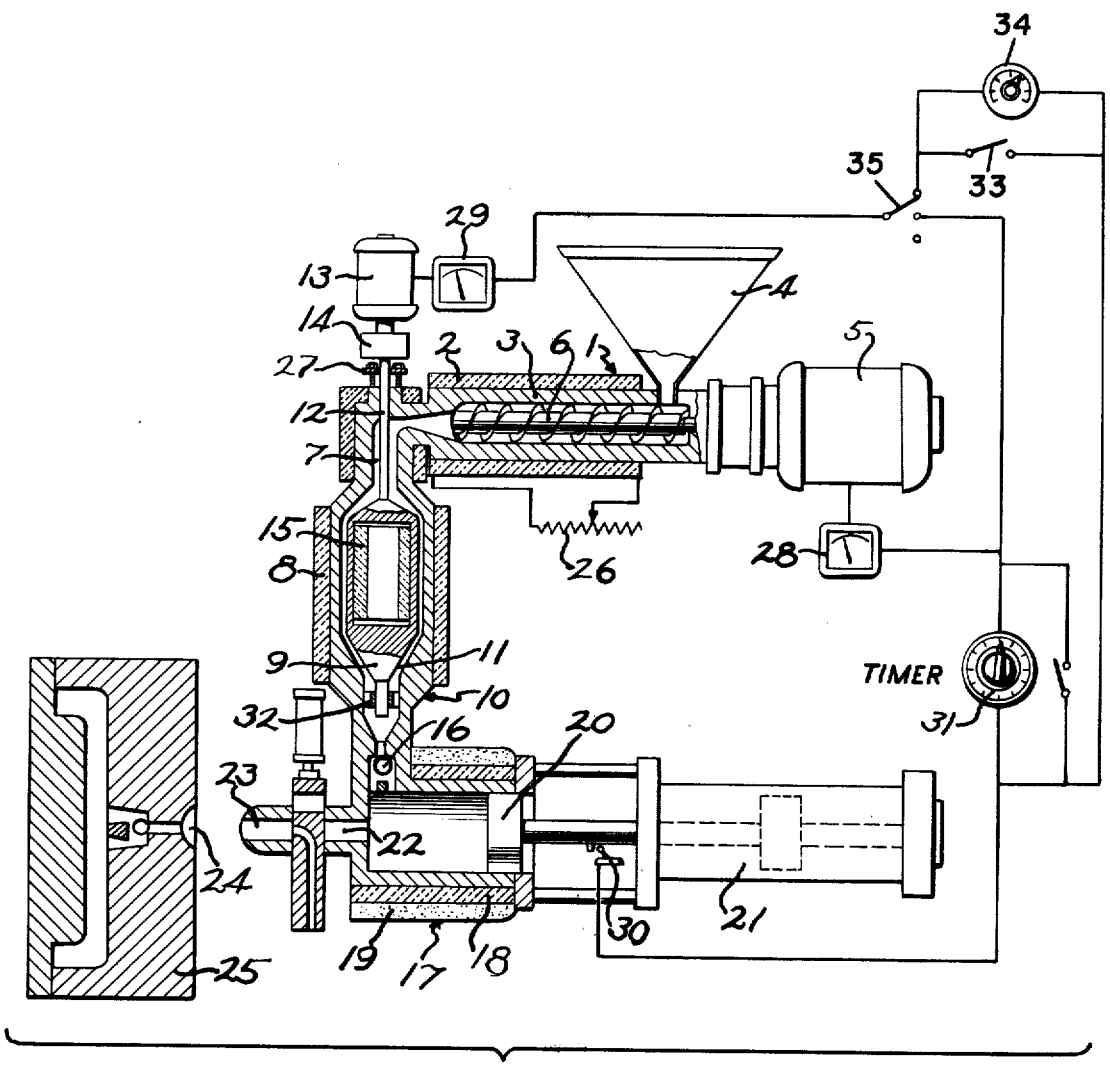
FIG. 1 is a somewhat schematic vertical sectional view of an injection molding machine embodying the principles of the present invention.

Referring to the drawing, a screw-type extruder 1 has a cylinder 3, which is heated by heating sleeves 2 and is equipped with a supply hopper 4 for a plastic mass mixed with a blowing or expanding agent. A motor 5 mounted by means of a flange to the extruder drives the screw 6 which is positioned within the cylinder 3. The plastic mass within the supply hopper is pushed in the direction of the screw axis and is melted and plasticized within the heated cylinder 3. The temperature of the cylinder 3 is, however, kept so low that the plastic mass is plasticized but the expanding agent within does not react.

The plasticized mass is pushed by the extruder into an intermediate housing 10 having an inter-connecting canal 7 which is heated by a heating sleeve 8 to such a degree that the plastic mass passing through it is heated above the reaction temperature of the blowing agent. Large heating surfaces, close contact of the plastic mass with the surfaces, and constant mixing of the plastic mass is achieved by equipping inter-connecting canal 7 with a treatment body such as a rotatable symmetrical body 9. The treatment body is surrounded by the housing 10 leaving only a small distance between them, so that between the rotating body 9 and the housing 10, a gap 11 of small width is formed. The rotating body 9 is mounted on an upwardly-extending shaft 12 which is driven by a motor 13. A downwardly-extending shaft at the lower end of the body 9 is carried in a bushing 32 carried in a spider which allows passage of the plastic mass. The shaft 12 is equipped with a commutator ring 14 which forms a contact with the rotating body and heating elements 15 arranged within the rotating body. The motor 13, ring 14, and the shaft 12 are supported on a table 27 adjustably carried on the housing 10 by means of a cluster of screws.

The heated, plasticized material flows through a non-return valve 16 into an accumulator 17, kept under constant temperature by a heating sleeve 18 and protected from heat losses by insulation 19. The accumulator is closed off by a piston 20, which is operated by a hydraulic drive cylinder 21. The front side of the transfer cylinder or accumulator contains an outlet canal 22 leading to a nozzle 23 equipped with a controllable closure. The closure is designed in such a way that it can clean the nozzle 23 with compressed air which is available. For injection molding of a body, the nozzle 23 is positioned in the tool nozzle 24 of a mold 25, the closure of the nozzle is opened, and the hydraulic drive cylinder 21 placed under pressure until the predetermined amount of plastic mass is transferred into the mold 25.

During operation, the extruder cylinder 3 is heated in such a way that its temperature has a rising gradient from the supply funnel 4 towards its exit. The mass of blowing agent and plastic granules supplied by the supply funnel 4 are moved along by the screw 6 and heated, molten, mixed, plasticized, and homogenized. The adjustment of the heating sleeve 2 is selected by a variable resistor 26 in such a way that at the exit of the cylinder 3 is produced a complete plasticized mass of the supplied thermoplastic, but the reaction temperature of the blowing agent is not yet reached. By selecting the blowing agent with readily-controllable reaction temperature, the heating of the extruder cylinder 3 is adjusted in such a way that the exit temperature stays so low that even partial reaction of the blowing agent is prevented. In this way, the breaking-out of gases at the rear of already reactive drive media is definitely prevented, and the screw can be selected with respect to its length and pitch exclusively for the task of plasticiz- A further heating of the thermoplastic above the reaction temperature of the blowing agent is made during its passage through the inter-connecting passage. By the use of the treatment body 9, the flowing stream is formed in accordance with the width of the gap and a relatively large heating surface is achieved with guarantees of good heat transfer. The gap is selected of such a small width (practically, a fraction of a millimeter) that by the counter-movement of the two limiting walls, namely the inside wall of the housing and the outside wall of the rotating body, the plastic material layer is contacted in its entire thickness and is made turbulent within the gap. The actual movement of the plastic mass is a combination of an axial component which activates the through-flow in combination with a second component in the circumferential direction, brought about by the relative rotation. An additional stream component is achieved through turbulence.

This turbulence increases the action of the heated surfaces since a new mass is always being brought into contact with these surfaces. The homogeneity achieved at the extruder exit is not influenced, because of the steady turbulence and mixing; temperature differences in comparable stream areas of the mass cannot exist. The friction losses thus created are in this case of advantage. They create additional heat for the plastic mass flowing through the inter-connecting passage. A further advantage is that, because of the turning of the rotating body, a movement of the plastic mass in circumferential direction is always achieved, so that for the required axial flow movement only a small resistance is created. The gap designed in accordance with this invention (with opposite-moving border areas rotating transversely of the flow direction) results in only a small pressure differential during flow-through, so that the built-up pressure at the exit of the extruder relative to that in the accumulator cylinder is very small. This makes it easier to increase pressure there to the required amount to prevent foaming. Furthermore, it is considered favorable to heating that the plastic mass flow not axially through the tube-shaped gap 11, but be forced by the component in the circumferential direction to flow spirally through the gap. This type of flow increases its speed which increases the residence time which in turn permits the heat flow necessary for the heating by relatively low temperature differences so that no danger of over-heating of the plastic mass may occur.

This invention permits the individual parts to fit into the whole aggregate to provide for its partial task. For example, the accumulator cylinder serves only for measuring a charge and to maintaining the pressure necessary to prevent foaming. The extruder serves exclusively for the function of plasticizing, for homogenizing, and for transporting the thermoplastic mass. The heating necessary to bring the temperature of the plastic mass above the reaction temperature of the mixed-in blowing agent is brought about exclusively within the inter-connecting passage 7 and directly in the gap 11 which not only provides the desirable large surface for the heat transfer, but, in addition, through the turning of the rotating body, produces a constant mixing of the plastic mass and introduces also an additional movement in the circumferential direction. By this, not only is the desired temperature achieved, but at the same time with constant mixing of the plastic mass, the homogeneity is increased, so that a practically complete homogeneous injection mass ready for use is created in the accumulator.

The extruder motor 5 is provided with a speed-adjusting means 28, while the motor 5 is provided with a similar speed-adjusting means 29. A limit switch 30 is associated with the accumulator piston 20 and serves to initiate a timer 31 connected to both speed-adjusting means. The switch acts through relays located in the means 28 and 29 to shut off their respective motors, but the timer 31 allows the motors 5 and 13 to continue in operation on predetermined time after the extruder reaches a certain point.

The motor 13 is provided with an additional timer 34 which is selectively made operative by a switch 33. When in operative condition it acts to decelerate the motor during starting and stopping. Thus, the motors 13 and 5 can be started and stopped at different times according to the operators wishes, the three-position switch 35 assisting in a selection of the mode of operation.

Figure 2:
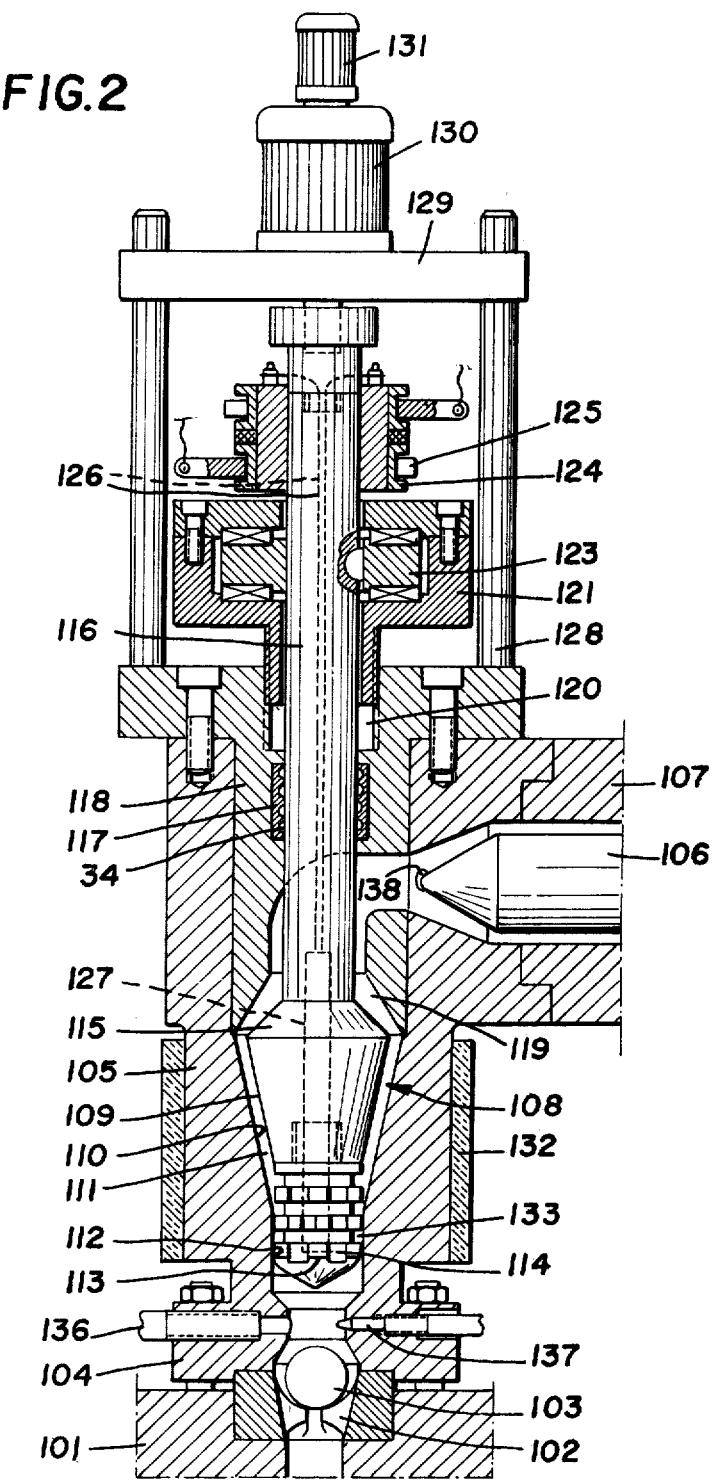
FIG. 2 is a vertical sectional view of a modified form of the machine.

FIG. 2 is a sectional view of the wall of transfer cylinder 101 which is equipped with a recess for inserting a support element 102 of a check valve. The valve body 103 has the shape of a sphere. A foot 104 of a housing 105 is under stress against the wall of the transfer cylinder 101 and contains a sealing seat for the valve body 103. The housing 105 is connected at its side to an extruder 107 which is equipped with a worm gear 106 for bringing about the introduction of the plasticized drive media mixed with plastics.

Within the housing 105 is located a rotating body 108 whose conical portion 109 lies in opposition to a conical surface 110 of the hollow housing, so that between them is formed a relatively small gap 111. To the conical portion 110 is attached a cylindrical section 112. The free end 113 of the rotation body 108 is equipped with a number of protrusions 114 which are separated by ring grooves 133 and axis-parallel grooves, especially longitudinal grooves which are displaced relative to each other in such a way so that also the protrusions 14 are arranged in displacement relative to each other. Their free face areas are considered always part areas of the cylindrical section 112 and are guided by this cylindrical section 12 to permit the rotation well as axial displacement for a support of the free end 13 of the rotatable body.

The base of the conical area 9 of the rotating body 108 is reduced by a flat conical transitional surface 115 to the diameter of shaft 116 which is guided by a support 117 equipped with labyrinth packings and arranged within a pipe sleeve 118. This pipe fitting contains also an inlet passage 119 through which the plasticized plastic is guided from the extruder to the gap 111. This passage cooperates with the transition surface 115 in such a way that, in the vicinity of the base of the conical surface 109, the desired gap thickness is achieved. The pipe sleeve 118 is also equipped with a threaded bore 120 in which an adjusting spindle 121 is guided. In a pot-type upper part of the adjusting spindle 121 are kept two thrust bearings which surround a collar 123. This collar is shrunk to the shaft 16 to permit axial displacement without turning. In addition, on an insulating body, tow drag rings 124 are arranged on the shaft 116 which, in connection with the fact that these drag pieces 125 rest on the drag rings 124, are able to feed electrical power to a cable 126 which leads to electric resistance bodies 127 arranged and going through a bore of the rotation body 108.

Also mounted on the pipe sleeve 118 are guide rods 128 on which is displaceably supported a bridge 129 which is connected to a hydraulic motor 130 for driving the rotation body 108. Above the hydraulic motor is a tachometer 131 which is also connected to the shaft 116. The housing 105 is surrounded by a heating coil 132 through which it may be heated.

During operation of this device, the granular plastic is transported forward within the extruder 107 by means of the transport device 106 and by the heating of the extruder it is melted and plasticized. The plastic mass which is heated close to the reaction temperature of a foaming media is pressed into the gap 111 through the entrance area 119 of the pipe sleeve 118 leading to the conical area 109 and the gap 111 formed by the rotating body 108 and conical section 110 of the housing 105. During this operation, the plastic mass will be heated above the reaction temperature of the foaming media. This heating can be changed by adjustment and at least partially brought about by resistance heating by the heating element 127 as also by the heating collar 132. For the heat transfer are available the relatively large inside areas of the housing 105 as well as the outside area of the rotation body 108. Local overheating, as well as cold areas of the plastic mass which are not in contact with the walls, is prevented by a good mixing which is effected within the opening by the rotation of the rotation body. It was found to be important that, during the rotation within the gap 111, the plasticized plastic which fills it create shear forces which have to be overcome though the momentum of the hydraulic motor 130; also this added mechanical work effects considerably a temperature rise of the plasticized plastic mass. This added mechanical heat may be exactly defined with regard to work and especially in its time limits. In case the flow of the plasticized plastic mass is interrupted during periodic stoppages, then the hydraulic motor 130 can be switched off at the same time (or after a predetermined time period) so that the additional heat in form of mechanical energy is interrupted immediately and without important thermal inertia.

By rotating the adjusting spindle 121 it may be axially displaced within its threaded bore. By means of the thrust bearing 122 and the collar 123, the adjusting spindle determines the axial adjustment of the rotation body 108. In case the body is displaced downwardly by the spindle 121, then the free end of the rotation body penetrates with its guiding cams 114, deeper into the cylindrical section 112 of the housing. The conical area 109 is displaced in the axial direction relative to the conical section 110 and, by displacement, the gap 111 formed between them is reduced. By adjusting the spindle 121, therefore, the gap 111 can be adjusted to a desired thickness. In case a plastic mass is used which has a higher temperature or viscosity, then the pressure differential may be reduced within the opening by turning the adjusting spindle 21 outwardly and so enlarging the gap. Basically, the pressure differential can also be reduced by the increase of the rate of revolution of the body 108. This operation, however, is accompanied by an increase of the added heat efficiency. By the free selection of the width of the gap 111 and the speed of the rotation body induced by the hydraulic motor 130, the pressure differential within the gap, mixing and homogenizing of the plastic mass and also the mechanical heat transfer by rotation may be selected at an optimum relationship. In the example shown, the axial displacement of the central adjusting spindle 121 determines the width of the gap 111.

FIG. 2 shows a design example in which the hydraulic motor 130 and the guarding tachometer 131 is mounted on a vertically displaceable bridge 129. The motor and the speedometer could also be mounted stationary, in which case the shaft 116, with which the motor is connected through a coupling, which may transfer the torsional momentum, but also permits axial displacement of the shaft relative to each other. On the other hand, it is also possible to omit the thrust bearing special collar 123 of the shaft 116 and to displace the hydraulic motor 130 through its bearing where the axial displacement of the shaft 116 is initiated.

It has been proven to be of special advantage to have the drive of the rotation body 108 act through a drive and to provide an electric motor in place of a hydraulic motor.

It has proven especially to be of advantage to make the support of the free end 113 of the rotation body 108 with opposed displaceably arranged cams. Already by through-flow through the gap 111, the plasticized plastic mass is not only heated above the reaction temperature of the foaming additive, but at the same time through turbulence is also homogenized within the opening. By out-flow from the opening of the plasticized plastic mass through the grooves 133 formed by the cams 114, an additional mixing of the plastic mass is achieved, so that a complete homogenized mass is guided to the transfer cylinder 101.

The shown design of the free end of the rotation body 108 has proved useful when the rotation body is not driven, but the drive is switched off. This can be the case at times during a short operating phase when a heating of the plastic mass by mechanical energy is not desired. Also, the plastic mass flowing through the grooves of the free ends and through several divisions, and the flowing together of the mass by turbulence and change of flow direction, causes homogenization, so that in the transfer cylinder a uniform homogenized plasticized plastic mass is maintained and so a pre-conditioning treatment is given to achieve a high quality of the cast. Also, in the case of an omitted drive or switched-off drive, it has been proven useful to fit the gap 111 to the corresponding conditions; in this case, mainly the amount of flow-through, the viscosity and the desired temperature rise, and the design of the cylindrical housing section 112 incorporating the supports to be displaced and the cams 114 in the housing will result in the desired high homogenity.

The heating and melting of the plastic mass inside the extruder and further heating of the plastic mass within gap 111 presents essentially a common problem. In case the transport of the plasticized mass into the transfer cylinder is suddenly interrupted or brought to a halt, then the plastic masses in the area of the walls could be overheated or at least brought to the higher temperature as desired. For observation of these different occuring temperatures, thermocouples 137 and 138 are mounted in the housing 105 in such a way that the thermocouples extend into the hollow spaces of the housing and so are in direct contact with the plasticized plastic mass, consequently measuring their temperature. For further observation a pressure connection 136 is located following the gap 111. In a number of cases, it could be desirable to deviate from the construction shown in FIG. 2 and the pressure connection could be arranged ahead of the gap 111.

The thermocouples permit not only the reading of the corresponding temperature relationships, but permit also automatic control of the amount of heat added to the plastic mass passing through the gap 111. They also permit the control or adjustments of the axial position of the rotation body 108 and, therefore, the opening between it and the housing.

Figure 3:
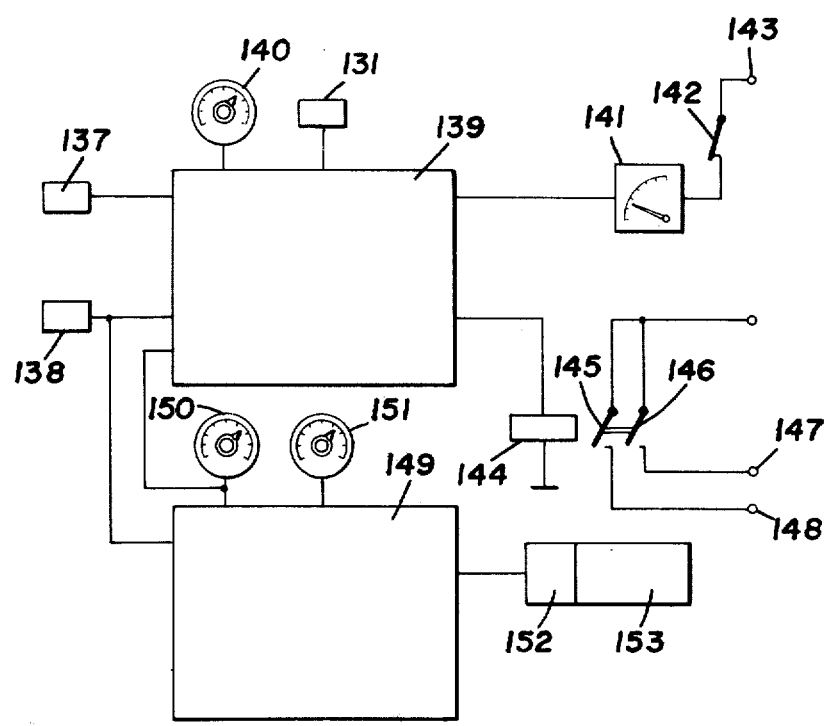
FIG. 3 is an electrical schematic diagram of controls used in the machine.

The controls shown in FIG. 3 provide a control device 129 ahead of which is arranged a theoretical value indicator 140, with which the desired temperature is predetermined with which the plasticized plastic mass is to enter the transfer cylinder 101. The thermocouple 137 is a true value indicator attached to the control device 139. To achieve a sensitive control, then not only the adjustable true value is considered, but in addition there is arranged a predetermined variable value to the control device 139 which indicates the temperature at the entrance with the thermocouples 138. As an adjusting member, a device 141 is arranged after the control device 139 to determine the speed of the hydraulic motor 130 driving the rotation body 108 of FIG. 2.

The outlet of this device is directed through a switch 142 to a connection 143, which acts on a relay valve where there is a hydraulic motor or is able to activate the control of an electrical motor. A close tolerance of the controllable revolutions is activated by a basic control circuit to which the tachometer 131 is attached. In the example shown in FIG. 3 the control device 139 is equipped with a further control member, a relay 144, which drives its contacts 145 and 146 through connections 147 and 148, thus influencing the activation of the heat resistance coil 127 as well as the heating collar 132.

In front of the control device 149 is arranged a device 150 for indicating the theoretical control device which shall predetermine the highest permissible temperature on the extruder exit. This also is transferred into a control circuit of the control device 139. As a true value-relay, a thermocouple 138 is arranged before the amplifier device. After the control device 149 follows a control member 152 as adjust member which acts upon a control motor 153 which is able to make the axial displacement of the rotation body 108 of FIG. 2. The control motor can also be designed as an electric motor engaging a gearing arranged on the adjusting spindle 121. There is also the possibility that the control member 152 be designed as a relay valve to act on an hydraulic cylinder which engages the bridge 129 and so is able to displace the control motor 130 with the shaft 116 in the axial direction.

During operation, the desired final temperature of the plasticized mass guided towards the transfer cylinder 101 can be predetermined with the control device 139. This control device which receives the temperature through thermocouple 137 takes the actual temperature on the exit of the opening and activates a controlled heating collar 132 and the sensitive controllable motor 130. Upon a lowering of the temperature, the revolutions of the motor are increased until the desired temperature introduced by the mechanical energy is achieved. The temperature variation still present at the exit of the extruder will be considered as a variable and checked with the thermocouple 138 to permit the final control of the desired values within close tolerances. The control of the rate of revolution of the motor 130 is supported in such a way that the control member in the design example does not act as a control member but will receive the control through the tachometer 131. The heating circuits could be equipped with thermocouples and changed to control circuits. At the same time the control device 139 will receive as a predetermined signal, the maximum permissible entrance value from the relay 150 with the sensed temperature given through thermocouple 138; in case this predetermined value is achieved or exceeded, then the added heat is reduced or switched off.

The control device 149 is supplied with the maximum permissible temperature through the theoretical value relay 150 at the exit of the extruder. Furthermore, the theoretical value relay 151 determines the practical adjustable value of gap 111 through the control device 149. In case the entrance temperature detected by the thermocouple 138 is impermissibly high, then the control which is activated by the theoretical value relay 151 becomes active and the adjusting member 152 enlarges the gap 111 by correspondingly activating the adjusting motor. Through the enlarging of the gap, the build-up of pressure is prevented. With low transport flow and large gear-worm revolutions of the extruder, a heating which is independent of added heat can be additionally achieved within the extruder. The undersirably high heating of the plasticized plastic, especially by longer retardation, could lead to undersirable disintegration or changes of its structure. Through axial displacement of the rotation body 108 in the gap 111, such jamming occurrences are definitely interrupted and undesirable heating by the mechanical energy of the extruder is prevented.

In practice, the machines for the fabrication of plastic mold bodies in injection moldings are often operated only intermittently. Generally, the filling of the transfer cylinders 101 extend over the total length of the working cycle at least during the filling operation of the mold; however, the continuous flow will be interrupted by a check valve and/or by switch-off of the extruder. By extreme long deforming time and consequently long cycles, it has been proven favorable in addition to extend this switch-off over the required measurement necessary for the injection procedure and so, during the filling of the transfer cylinders, to receive a stronger transport flow. In these cases, it has been proven to be of advantage (through each phase of the cycle-indicating devices or the devices for reproducing the degree of filling of the transfer cylinder) to influence the control device and the switch-off for such interruption of further heat energy flow. In the design example, the motor 130 may be switched off by opening a switch 142, so that such additional heat flow can be switched off immediately. As support, the heating coil and the heating collar may be interrupted by the relay 144 or by opening of one of the switches of contact 145 and 146. This switch-off is not only done through the control device itself, but through the programmed control of the device. It has been proven to be of advantage that the switch-off and also the switch-on for resumption of the transport be operated under pre-action. The time interval between switch-off of the heating and the adjustment of the transport can be chosen larger than the time interval between switch-on of the heating and start of the transport. In the case of heat introduction by the motor 130, the pre-action times can be kept considerably smaller than with the undesirable inertia-effected heating through heat resistance and, if necessary, a pre-action by operating of the motor can be completely eliminated.

The invention can be varied further; the design as shown in the drawing has the same steep angle for the conical areas 109 of the rotation body 108 and also the surrounding conical section 110 of the housing. These angles may differ in small values, so that the width of the formed gap 111 over the length of the conical area 109 results in small increases or decreases. The surface of the rotation body 108 and of the housing 105 can be equipped with longitudinal grooves in the conical area 109 or in the conical section 110. Further variations result when these longitudinal grooves run somewhat at an angle or slightly have the form of a screw shape line thread. These grooves may be designed with unequal flanks and may be closed off towards the free end.

In the example shown, the collar 123 is shrunk to the shaft 116 and additionally secured against turning forces by a spring. This collar can also be made integral with the shaft 116; the shaft 116 can be made out of one piece together with the rotation body 108 or can be connected with it. Furthermore, it is evident that the collar 123 forming a ring-shape body, could be put under stress with a ring nut against a collar on the shaft 16. This bracing could be effected through a piece of pipe and the ring nut can be arranged on the other side of the collars carrying the drag rings 124, so that this collar is also included in the bracing. Purposely, the drag pieces 125 are connected to the bridge 129 or are arranged on their own gliding guide pieces on the guide bars 128.

It has been proven to be of advantage to equip the circumference of the adjusting spindle with penetrations to make the insertion of tools easier or equip the adjusting spindle with grooves for easier adjustment. It was found to be of advantage to equip the spindle with an arresting device or stop which permits the arresting of the adjusting spindle in the always desired position.

The support 117 is selected, as is the labyrinth gasket forming ring grooves 134, in such a way that only very small leakage losses are apparent. By this method, an extended dwelling of the plastic mass to be transported is prevented so that through longer dwelling under higher temperature, the plastic mass disintegrates. Also, during collar or material replacement, the plastic mass of a previously-transported mixture cannot reach the transfer cylinder, but is slowly and surely directed to the outside.

The invention permits the design of a device for fabrication of plastic mold bodies in injection molds in such a way that the mass which is to be sprayed and stored in the transfer cylinder is always kept with the same temperature without undesirable pressure drop and high homogenity and also during strong spontaneous changing flow rates.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Injection molding apparatus, comprising
a. a screw-type extruder driven by a motor, the extruder having a housing containing heating elements,
b. an accumulator having a cylindrical chamber whose axis is spaced from the extruder, the accumulator having a loading piston lying in the chamber, the accumulator also having a wall containing heating elements,
c. an intermediate housing extending between the extruder and the accumulator, the walls of the housing defining a treatment chamber being provided with heating means, and
d. a treatment element lying in the treatment chamber to define a thin annular passage therebetween, the end of the treatment chamber and the end of the treatment element adjacent the accumulator being provided with generally pointed surfaces, and the element being axially adjustable in the treatment chamber to accurately determine the thickness of the passage therebetween.

2. Injection molding apparatus as recited in claim 1, wherein the treatment element is provided with a heating element.

3. Injection molding apparatus as recited in claim 1, wherein the treatment element is mounted for rotation about the axis of the annular passage, and a motor is connected to the element for the rotation thereof.

4. Injection molding apparatus as recited in claim 3, wherein a first means is provided to control the speed of the extruder motor, a second means is provided to control the speed of the treatment element, a limit switch is associated with the accumulator piston, and electrical circuitry connecting the first means, the second means, and the limit switch to shut off the motors when the accumulator is being unloaded, the circuitry including a timer which may operate to cause the motors to shut off for a predetermined time when the accumulator reaches a certain point.

5. Injection molding apparatus as recited in claim 4, wherein the said circuitry includes an additional timer, one of said timers being effective for shutting off the extruder motor, while the other of said timers is effective to shut off the motor of the treatment element allowing cutting off the motors at and/or for different times.

6. Injection molding apparatus as recited in claim 4, wherein the said electric circuitry is connected further on with at least one of the said heating elements switching such heating element in timed relation with shutting off the motor of the treatment element.

7. Injection molding apparatus as recited in claim 6, wherein said electric circuitry includes timing means effecting a predetermined time shifting between switching said heating elements and shutting off the motor of the treatment element.

8. Apparatus for the fabrication of plastic-foam bodies with injection moldings having an extruder by which the thermoplastic mixed with an expansion media is plasticized below the reaction temperature of the media and is introduced continuously to a transfer cylinder through a connecting canal, having a rotating body independent of the extruder surrounded closely by a housing, having a motor by which the rotating body is driven and by which the thermoplastic mass is pressed with an axial component through a thin gap formed between the rotating body and the housing, having means whereby the thermoplastic during passing is heated above the reaction temperature, and having means whereby the built-up pressure within the transfer cylinder prevents a foaming of the plastic mass until it is injected into the mold, characterized by the fact that the rotating body (108) and the surrounding housing (105) are formed with conical surfaces over at least the portions which form the aforementioned gap (111) and that the rotating body is mounted on an adjustable support so that the axial relationship between the body and the housing can be changed to adjust the gap.

9. Apparatus according to claim 8, characterized by the fact that the shaft (116) of the rotation body (108) is equipped with a fixed collar (123) which is rotatably carried in a support (122) which is capable of being adjusted axially relative to the housing.

10. Apparatus according to claim 8, characterized by the fact that the motor (130) or its driving gear is also carried in the support (122).

11. Apparatus according to claim 8, characterized by the fact that the shaft (116) which drives the rotating body (108) is connected with the driving motor through a coupling, which is axially displaceable on the shaft (116).

12. Apparatus according to claim 8, characterized by the fact that the housing (115) in its conical section (110) is joined with a cylindrical section (112) in which is guided a cylindrically-shaped free end (113) of the rotating body (108).

13. Apparatus according to claim 12, characterized by the fact that piercings on the free end are designed as ring- and axis-parallel grooves (133) and the free end (113) is divided into cams (114) whose face areas with a cylindrical section (112) fit a cylindrical shell.

14. Apparatus according to claim 8, characterized by the fact that the cones (109) of housing (105) and the rotating body (108) form the gap (111) reducing themselves towards the side of the rotation body located opposite the shaft (116).

15. Apparatus according to claim 8, characterized by the fact that the cones of the housing (105) and rotating body (108) forming the gap (111) have the same angle.

16. Apparatus according to claim 8, characterized by the fact that the cones of the housing (105) forming the gap (111) differ somewhat in their angles.

17. Apparatus according to claim 8, characterized by the fact that the base of the gap (111) which limits the cone (109) of the rotating body (108) reduces itself conically and streamline-body-shaped towards the diameter of its shaft (116).

18. Apparatus according to claim 17, characterized by the fact that the housing surrounds the reducing part (105) in a funnel-shaped manner and with a larger cross section in the direction of the shaft (116).

19. Apparatus according to claim 18, characterized by the fact that the inlet area (119) is formed in a replaceable fitting (118) carried in the housing.

20. Apparatus according to claim 8, characterized by the fact that the axial adjustment between the housing (105) and the rotating body (108) is determined by a disc which is fixed relative to the body and is mounted to be axially adjustable relative to the housing.

21. Apparatus according to claim 8, characterized by the fact that the axial adjustment between the housing (105) and the rotating body (108) is determined by screw connections threadedly engaged by the body and pressing against the housing.

22. Apparatus according to claim 8, characterized by the fact that the axial adjustment that exists between the housing (105) and the rotating body (108) is determined by an adjusting motor operating on a screw.

23. Apparatus according to claim 8, characterized by the fact that the housing (115) in which between the housing and the rotation body (108) is formed the gap (111) is equipped with thermocouples (137, 138) whose test points determine the temperature which exists in the housing.

24. Apparatus according to claim 8, characterized by the fact that the housing (105) in which between the housing and the rotation body is formed the gap (111) are equipped with pressure indicators (136).

25. Apparatus according to claim 8, characterized by the fact that a control device is provided to determine the temperature of the transfer cylinder (1) for the introduced plastic mass, that following the control device (139) is provided an adjusting member (141) which regulates the speed of the motor driving the rotation body (108) and that a relay is provided with a thermocouple (137) located following the gap (111).

26. Apparatus according to claim 25, characterized by the fact that a thermocouple (138) located before the gap (111) operates with a control device (139) to indicate the presence of trouble.

27. Apparatus according to claim 26, characterized by the fact that following the control device (139) are provided control members including switch members (144, 145, 146), which determine the operation of the heating elements (127), 137).

28. Apparatus according to claim 27, characterized by the fact that ahead of the control device (149) is arranged a control member (152) serving as control member for the adjusting motor (153) to the device for axial adjustment of the rotating body (108) and thermocouple (138) is arranged ahead of the gap (111) as a control range relay and, when exceeding predetermined entrance temperatures, the width of the gap (111) will be increased by predetermination by a theoretical value relay (151).

* * * * *